United States Patent
Kwon et al.

(10) Patent No.: US 9,007,010 B2
(45) Date of Patent: Apr. 14, 2015

(54) SYSTEM AND METHOD FOR CALIBRATING OFFSET OF MOTOR RESOLVER

(71) Applicants: Hyundai Motor Company, Seoul (KR); Kia Motors Corporation, Seoul (KR)

(72) Inventors: Soon Woo Kwon, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 13/687,924

(22) Filed: Nov. 28, 2012

(65) Prior Publication Data

US 2014/0015457 A1 Jan. 16, 2014

(30) Foreign Application Priority Data

Jul. 12, 2012 (KR) .................. 10-2012-0076262

(51) Int. Cl.
| | |
|---|---|
| *G01B 7/30* | (2006.01) |
| *H02P 21/00* | (2006.01) |
| *H02P 6/16* | (2006.01) |
| *H02P 21/14* | (2006.01) |

(52) U.S. Cl.
CPC .............. *H02P 21/0096* (2013.01); *H02P 6/16* (2013.01); *H02P 21/146* (2013.01)

(58) Field of Classification Search
CPC ........ B60L 15/00; G05B 19/31; B64C 17/06; G06F 19/00; G01C 21/00; H02P 21/00; G01B 7/30
USPC .................................. 318/602, 605, 661, 490
See application file for complete search history.

(56) References Cited

U.S. PATENT DOCUMENTS

| | | | | |
|---|---|---|---|---|
| 5,280,718 | A | * | 1/1994 | Drake et al. ...................... 73/129 |
| 5,489,845 | A | * | 2/1996 | Weber et al. .............. 324/207.25 |
| 6,496,784 | B1 | * | 12/2002 | Dukart et al. .................... 702/94 |
| 6,834,244 | B2 | * | 12/2004 | Kim ................................ 702/72 |
| 7,299,708 | B2 | | 11/2007 | Ho |

FOREIGN PATENT DOCUMENTS

| | | |
|---|---|---|
| JP | H11-103596 | 4/1999 |
| JP | 2001-008487 A | 1/2001 |
| JP | 2001-275375 A | 10/2001 |
| JP | 2011-087413 A | 4/2011 |
| KR | 10-2011-0048979 A | 5/2011 |
| KR | 10-2011-0105451 A | 9/2011 |

* cited by examiner

*Primary Examiner* — Bentsu Ro
(74) *Attorney, Agent, or Firm* — Mintz Levin Cohn Ferris Glovsky and Popeo, P.C.; Peter F. Corless

(57) ABSTRACT

Provided is a system and method for calibrating an offset of a resolver in a motor of a vehicle. More specifically, a current is applied to the –d-axis of the motor, the Vq, Vd, Iq, and Id of the motor is measured and a power input to the motor is calculated by a controller, and when the input power is not within a predetermined range, the controller adjusts the offset of the resolver to a positive or negative value accordingly.

15 Claims, 3 Drawing Sheets

SYSTEM AND METHOD FOR CALIBRATING OFFSET OF MOTOR RESOLVER

CROSS REFERENCE

This application claims under 35 U.S.C. §119(a) the benefit of Korean Application No. 10-2012-0076262 filed Jul. 12, 2012, the entire contents of which application is incorporated herein by reference.

BACKGROUND OF THE INVENTION

1. Field of the Invention

The present invention relates, in general, to a system and method for calibrating an offset of a position sensor of a motor in an algebraic solution, instead of a geometrical solution as is done conventionally.

2. Description of the Related Art

Recently, with the increased need for eco-friendly vehicles, drive systems within these vehicle are being increasingly replaced with an electronic motor. Such eco-friendly vehicles include hybrid vehicles, electric vehicles, fuel cell vehicles, etc. which all use a motor as a drive source.

Such motors generally use a position sensor called a resolver that is installed on a shaft of the motor. The resolver may be thought of as a transformer in which a certain magnitude and frequency of voltage is applied to an input thereof and a transformation ratio varies depending upon the position of a rotor. Also, a signal that is amplitude modulated by sinusoidal and cosine functions with respect to the position of the rotor is output to tow outputs thereof. An RDC calculates the position of the resolver when the output is input. This is also a reason why the offset between the rotor positions of the motor rotor and resolver rotor needs to be calibrated.

In dynamic models (DYNAMO) for a motor, because of the existence of a torque sensor, it is possible to correctly set the offset of a resolver by applying −d-axis current to the motor to find the location in the motor where there is no torque. However, when motors have to be replaced in garages after having been mass produced, the garages generally do not have DYNAMO equipment and therefore no torque sensor as well. Accordingly, the appropriate angle must be calibrated using geometric software.

To this end, in the case of hybrid vehicles, a revolution speed is somewhat controlled by an engine that is directly connected with a motor. In the motor, however, when 0 current control is applied, the voltage that is generated corresponds to back electromotive force, so that when the offset calibration is corrected, only q-axis voltage occurs. Thus, when the calibration is not correct, d-axis voltage is also generated so that the offset can be calibrated using the magnitude of d-axis voltage.

This is a conventional offset-calibration method. While this method has no problem being used when the d-axis and q-axis are kept perpendicular, when there are any manufacturing defects, in the coordinates of an observed system as shown in FIG. 2, the d-axis and q-axis are not perpendicular, so that such a method is not applicable.

In the related art, such an offset may be calibrated using the following methods. A conventional offset calibration method will now be described with reference to FIGS. 1 and 2. In the conventional art, typically one or more hybrid control units (HCU) 101 is configured to control an engine 102 and motor 103 and an motor control unit (MCU) that is configured to control the motor current. In particular, in the convention method current is only applied to −d-axis in order to prevent generation torque, and thus when torque is generated, Δθ is calculated and reflected thereto, so that the offset of a resolver is calibrated by the following equations.

$$v_{\alpha\beta} = e^{-j\Delta\theta} v_{dq} = jv_q(\cos\Delta\theta - j\sin\Delta\theta) = v_q\sin\Delta\theta + jv_q\cos\Delta\theta$$

$$v_\alpha = v_q\sin\Delta\theta$$

$$v_\beta = v_q\cos\Delta\theta$$

$$\Delta\theta = \tan^{-1}\left(\frac{v_\alpha}{v_\beta}\right)$$

$$\theta_{updated} = \theta - \Delta\theta$$

However, since as previously described, a problem with such a method is that because of manufacturing errors, in the coordinates of an observed system, the d-axis and the q-axis are originally and potentially not perpendicular, even though Δθ is calculated and reflected thereto, so that the method essentially involves errors.

The description of the related art is merely for the purpose of understanding the background of the present invention, so it should not be construed to the person skilled in the art that the description of the present invention is admitted as pertaining to the related art.

SUMMARY OF THE INVENTION

Accordingly, the present invention proposes a system and method of finding a specific rotor position on a resolver by correlating power input with the output of a motor.

In order to achieve the above object, according to one aspect of the present invention, there is provided a method for calibrating the offset of a resolver in a motor of a vehicle. In particular, a current is first applied to the −d-axis of the motor and Vq, Vd, Iq, and Id of the motor are measured. Then, a power input to the motor is calculated, and when the input power is not within a predetermined range, the offset of the resolver is adjusted to a positive or negative value.

During calculation of input power, the input power (Pin) may be calculated via an equation: Pin=1.5×(Vd×Id+Vq×Iq).

In the adjustment of the offset, the offset may be adjusted by a certain magnitude of a positive or negative value, and then the application of current and calculation of the input power are re-performed. After the adjustment of the offset, the application of the current and calculation of the input power are again repeated, when the input power is within the predetermined range, the adjustment process is terminated.

During adjustment of the offset, when the input power is less than a lower limit of the predetermined range, the offset of the resolver may be adjusted to the negative value, and when the input power is above an upper limit of the predetermined range, the offset may be adjusted to the positive value. Furthermore, the exemplary embodiment of the present invention may also include a preparation stage which maintains the rpm of the motor constant rate. In the preparation stage, the rpm of the motor may be kept constant by controlling the rpm of the engine of a vehicle.

In another aspect of the present invention, there is provided a system and method for calibrating the offset of a resolver in a motor of a vehicle. In this system and method, the motor is prepared so that the rpm of the motor is kept constant; then an instruction is issued to apply a current of 180 degrees in a polar coordinate system to the motor; measuring Vq, Vd, Iq, and Id of the motor and the power input to the motor is calculated; and when the input power is not within a predetermined range, the offset of the resolver is adjusted to a positive or negative value.

In a further aspect of the present invention, there is provided a system and method for calibrating the offset of a resolver in a motor of a vehicle. After current has been applied to the motor so that no torque is output while the rpm of the motor is kept constant, the Vq, Vd, Iq, and Id of the motor is measures and the power input to the motor is calculated, and when the input power is not within a predetermined range, the offset of the resolver is adjusted to a positive or negative value.

As set forth before, according to the system and method for calibrating the offset of a resolver in a motor of a vehicle, although the d-axis and the q-axis are not perpendicular, the output performance of the motor can be secured.

Further, while the conventional method which uses the position due to back electromotive force to find the rotor position using a geometrical equation, the present method finds the rotor position using the magnitude of power in an algebraic manner, so that in spite of severe geometrical distortion, the distortion can be precisely calibrated in an algebraic manner without having to find an the appropriate angle.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
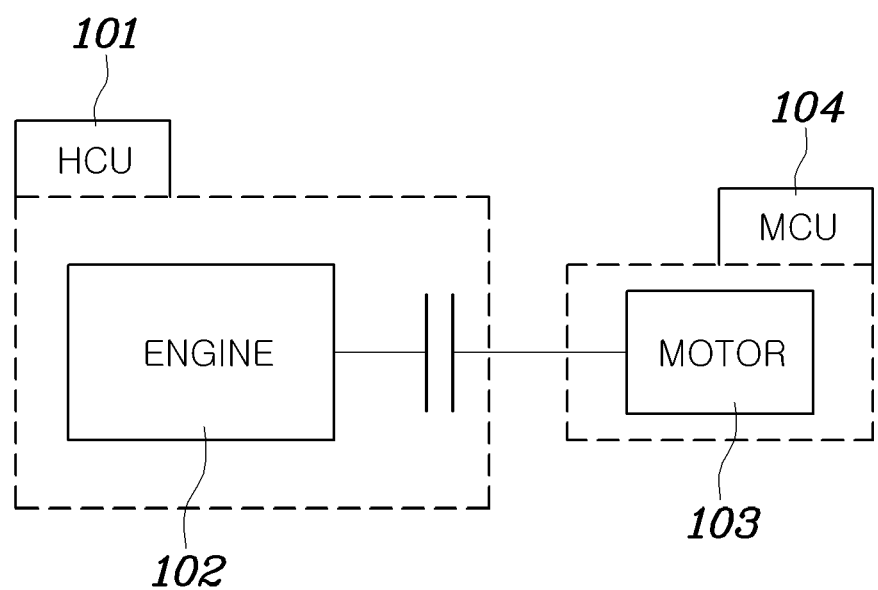
FIG. 1 is a view showing a conventional drive system of a hybrid car.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum) that include an electric motor. As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although the above exemplary embodiment is described as using a controller made up of one or more processors configured to specifically execute instructions to perform the below process, it is understood that the below processes may also be performed by a plurality of controllers as well.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference will now be made in greater detail to a preferred embodiment of the invention, an example of which is illustrated in the accompanying drawings. Wherever possible, the same reference numerals will be used throughout the drawings and the description to refer to the same or like parts.

A system and method for calibrating the offset of a resolver in a motor of a vehicle includes: applying, by controller, current to the −d-axis of the motor (S200); measuring, by the controller, Vq, Vd, Iq, and Id of the motor and calculating, by the controller, power input to the motor (S300); and when the input power is not within a predetermined range, adjusting the offset of the resolver to a positive or negative value (S400).

The method may further include the preparation stage (S100) in which the method initially maintains the rpm of the motor at constant a constant rate by, (e.g., controlling the rpm of the engine of the vehicle). Since the present invention is of course not limited to hybrid vehicles only, it is possible to maintain the rpm of the motor at constant rate by using a separate device such as a cotter dynamo, or a motor controller, as well as using an engine directly connected with the motor.

Figure 2:
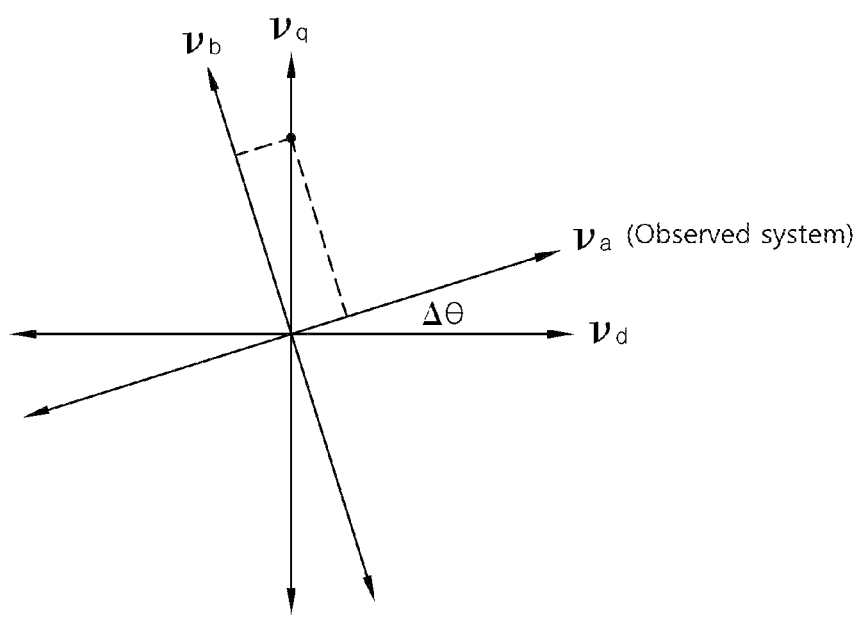
FIG. 2 is a view showing a coordinate system with respect to voltage for explaining a conventional method of calibrating the offset of a resolver in a motor of a vehicle.

Once the rpm of the motor has been maintained at a constant rate, stage S200 is performed in which current is applied to the −d-axis of the motor. Here, since in the application stage, it is required that the current be applied so that no torque is generated on the motor the current is applied to the −d-axis of the motor, or otherwise an instruction is issued so that the current of 180 degrees in a polar coordinate system is applied to the motor. This correlation can be easily understood when referring to FIG. 2. When the current is applied to the −d-axis of the motor and a correct coordinate system originally coincides with an observed system, the voltage in the q-axis is typically not observed. However, when such two coordinates do not coincide with each other, the voltage in the q-axis may be detected accordingly.

While such an offset is geometrically calculated in the related art, this type of geometric calculation is not precise because when axes of a coordinate system itself are not perpendicular, the calculation of a trigonometric function intrinsically involves some form of error.

In contrast, the present invention calibrates an error in an algebraic manner by measuring Vq, Vd, Iq, and Id of the motor and calculating the power input to the motor (S300) to analyze the input power of the motor, and when the input power is not within a predetermined range, adjusting the offset of the resolver to a positive or negative value (S400).

In the exemplary embodiment of the present invention a controller, e.g., a motor controller, may be configured to measure the current and voltage of the d and q-axes that are output from the motor, and then calculate the input power of the motor using the measured Vq, Vd, Iq, and Id. In the exemplary embodiment of the present invention, Vq stands for the voltage in the q axis, Vd represents the voltage in the d axis, Iq represents the current in the q-axis and Id represents the current in the d-axis. That is, the exemplary embodiment of the present invention locates the rotor position of the resolver using a correlation between the input and output power of the motor. Thus, it is understood that when torque is generated, output power is generated so that the input power is observed (for example, the input power can be known by the motor controller), and thus the input power is input to the −d-axis based on the magnitude of input power. Here, in the calculation (S300) of input power, the input power (Pin) may be calculated by the following equation:

$$Pin=1.5\times(Vd\times Id+Vq\times Iq) \qquad \text{Eq. 1}$$

Specifically, during adjustment (S400) of the offset, the offset may be adjusted by a certain magnitude of a positive or negative value (S410, S420, S430, and S440), and then the application (S200) of the current and the calculation (S300) of the input power are re-performed, and after the adjustment of the offset, the application of current and calculation of the input power are again repeated, and when the input power is within the predetermined range, the adjustment is terminated. For example, during adjustment (S400) of the offset, when the input power is less than a lower limit of the predetermined range, the offset of the resolver may be adjusted to the negative value (S430), and when the input power is above an upper limit of the predetermined range, the offset may be adjusted to the positive value (S440).

Figure 3:
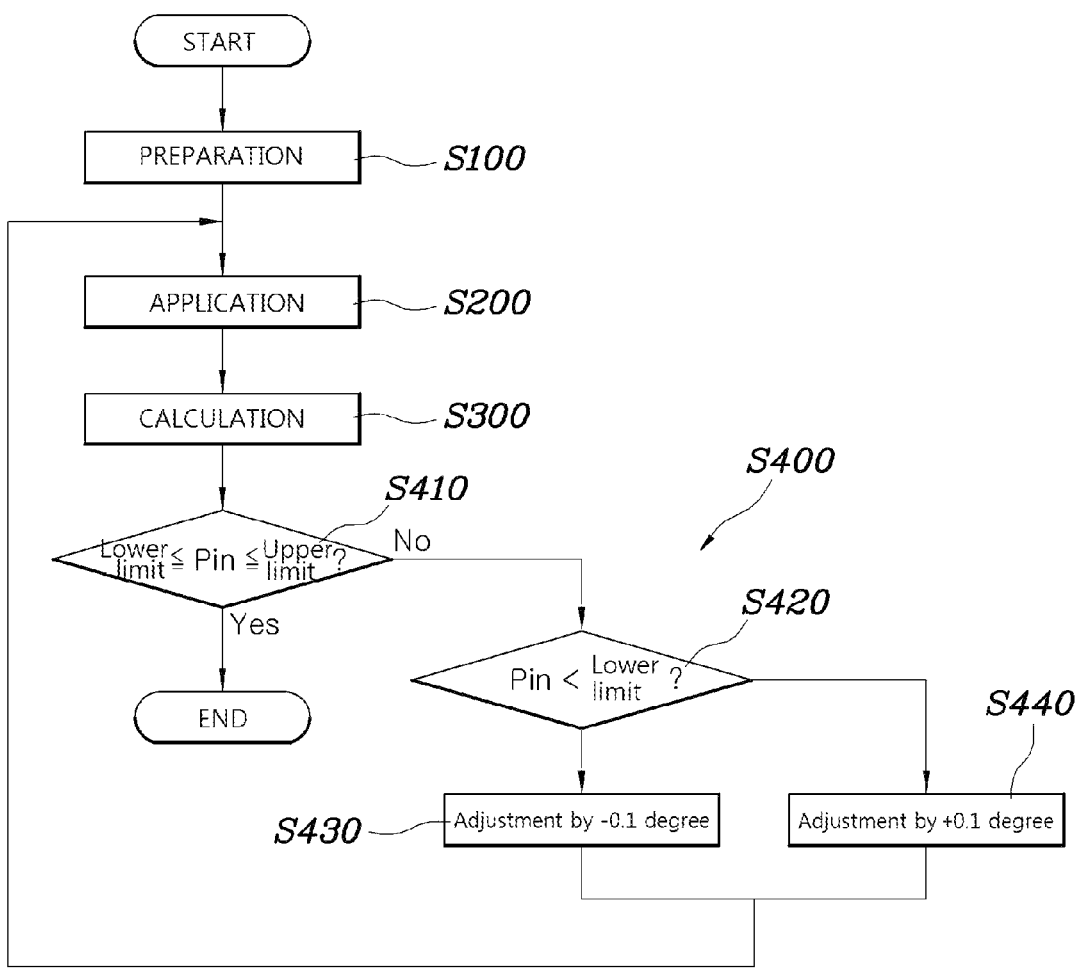
FIG. 3 is an exemplary flow diagram of a system and method of calibrating the offset of a resolver in a motor of a vehicle according to an exemplary embodiment of the invention.

In the embodiment of FIG. 3, the adjustment is conducted in increments of 0.1 degree so that the originally set offset is calibrated by 0.1 degree and then the current is applied and the output is measured. Then, the calibration is performed again so as to eliminate the offset. This method considerably reduces the amount of the offset relative to the conventional method, thereby offsetting a reduction in the output of the motor.

In the meantime, there is also provided a method for calibrating the offset of a resolver in a motor of a vehicle, the method including: issuing, by the controller, an instruction to apply a current of 180 degrees in a polar coordinate system to the motor (S200); measuring, by the controller, a Vq, Vd, Iq, and Id of the motor and calculating the power input to the motor (S300); and when the input power is not within a predetermined range, adjusting the offset of the resolver to a positive or negative value (S400).

Alternatively, after the current has been applied to the motor so that no torque is output while the rpm of the motor is kept constant, a Vq, Vd, Iq, and Id of the motor may be measured and the power input to the motor may be calculated. Then when the input power is not within a predetermined range, the offset of the resolver may be adjusted to a positive or negative value.

Advantageously, the offset of a resolver in a motor of a vehicle may be calibrated even though the d-axis and the q-axis are not perpendicular, the output performance of the motor can be secured. Further, while the conventional method uses the position of back electromotive force finds the rotor position using a geometrical equation, the present method finds the rotor position using the magnitude of power in an algebraic manner, so that in spite of severe geometrical distortion, the distortion can be precisely calibrated in an algebraic manner.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for calibrating an offset of a resolver in a motor of a vehicle, the method comprising:
   applying, by a controller, current to a −d-axis of the motor;
   measuring, by the controller, Vq, Vd, Iq, and Id of the motor and calculating a power input to the motor, wherein Vq is the voltage in a q axis, Vd is the voltage in the d axis, Iq is the current in the q-axis and Id is the current in the d-axis; and
   when the input power is not within a predetermined range, adjusting, by the controller, the offset of the resolver to a positive or negative value accordingly.

2. The method according to claim 1, wherein the input power (Pin) is calculated by an equation: Pin=1.5×(Vd×Id+Vq×Iq).

3. The method according to claim 1, wherein the offset is adjusted by a certain magnitude of the positive or negative value, and then the current is reapplied and the input power is recalculated, and after adjusting the offset, the current is again reapplied and the input power is again recalculated, and then when the input power is within the predetermined range, adjusting is terminated.

4. The method according to claim 1, wherein when the input power is less than a lower limit of the predetermined range, the offset of the resolver is adjusted to a negative value, and when the input power is above an upper limit of the predetermined range, the offset is adjusted to a positive value.

5. The method according to claim 1, further comprising initially maintaining an rpm of the motor at a constant rate.

6. The method according to claim 5, wherein the rpm of the motor is maintained at the constant rate by controlling an rpm of an engine of the vehicle.

7. A method for calibrating the offset of a resolver in a motor of a vehicle, the method comprising:
   issuing, by a controller, an instruction to apply a current of 180 degrees in a polar coordinate system to the motor;
   measuring Vq, Vd, Iq, and Id of the motor by the controller and calculating the power input to the motor, wherein Vq is the voltage in a q axis, Vd is the voltage in the d axis, Iq is the current in the q-axis and Id is the current in the d-axis; and
   when the input power is not within a predetermined range, adjusting, by the controller, the offset of the resolver to a positive or negative value.

8. A method for calibrating the offset of a resolver in a motor of a vehicle, the method comprising:
   once a current has been applied to the motor so that no torque is output while the rpm of the motor is maintained at a constant rate, measuring, by a controller, Vq, Vd, Iq, and Id of the motor and calculating the power input to the motor, wherein Vq is the voltage in a q axis, Vd is the voltage in the d axis, Iq is the current in the q-axis and Id is the current in the d-axis; and
   when the input power is not within a predetermined range, adjusting, by the controller, the offset of the resolver to a positive or negative value.

9. A non-transitory computer readable medium for calibrating an offset of a resolver in a motor of a vehicle containing program instructions executed by a controller, the computer readable medium comprising:
   program instructions that apply current to a −d-axis of the motor;

program instructions that measure Vq, Vd, Iq, and Id of the motor and calculate a power input to the motor, wherein Vq is the voltage in a q axis, Vd is the voltage in the d axis, Iq is the current in the q-axis and Id is the current in the d-axis; and program instructions that adjust the offset of the resolver to a positive or negative value when the input power is not within a predetermined range accordingly.

10. The non-transitory computer readable medium according to claim 9, wherein the input power (Pin) is calculated by an equation: Pin=1.5×(Vd×Id+Vq×Iq).

11. The non-transitory computer readable medium according to claim 9, wherein the offset is adjusted by a certain magnitude of the positive or negative value, and then the current is reapplied and the input power is recalculated, and after adjusting the offset, the current is again reapplied and the input power is again recalculated, and then when the input power is within the predetermined range, adjusting is terminated.

12. The non-transitory computer readable medium according to claim 9, wherein when the input power is less than a lower limit of the predetermined range, the offset of the resolver is adjusted to a negative value, and when the input power is above an upper limit of the predetermined range, the offset is adjusted to a positive value.

13. The non-transitory computer readable medium according to claim 9, further comprising program instructions that initially maintain an rpm of the motor at a constant rate.

14. The non-transitory computer readable medium according to claim 13, wherein the rpm of the motor is maintained at the constant rate by controlling an rpm of an engine of the vehicle.

15. A system for calibrating an offset of a resolver in a motor of a vehicle, the system comprising:

a motor configured to help drive a vehicle, the motor including a rotor; and a controller configured to apply current to a −d-axis of the motor, measure Vq, Vd, Iq, and Id of the motor and calculate a power input to the motor, wherein Vq is the voltage in a q axis, Vd is the voltage in the d axis, Iq is the current in the q-axis and Id is the current in the d-axis, and adjust the offset of the resolver to a positive or negative value when the input power is not within a predetermined range accordingly.

* * * * *